July 31, 1923.
C. M. DALY
1,463,576
COOKER ATTACHMENT FOR AUTOMOBILE RADIATORS
Filed Sept. 21, 1922
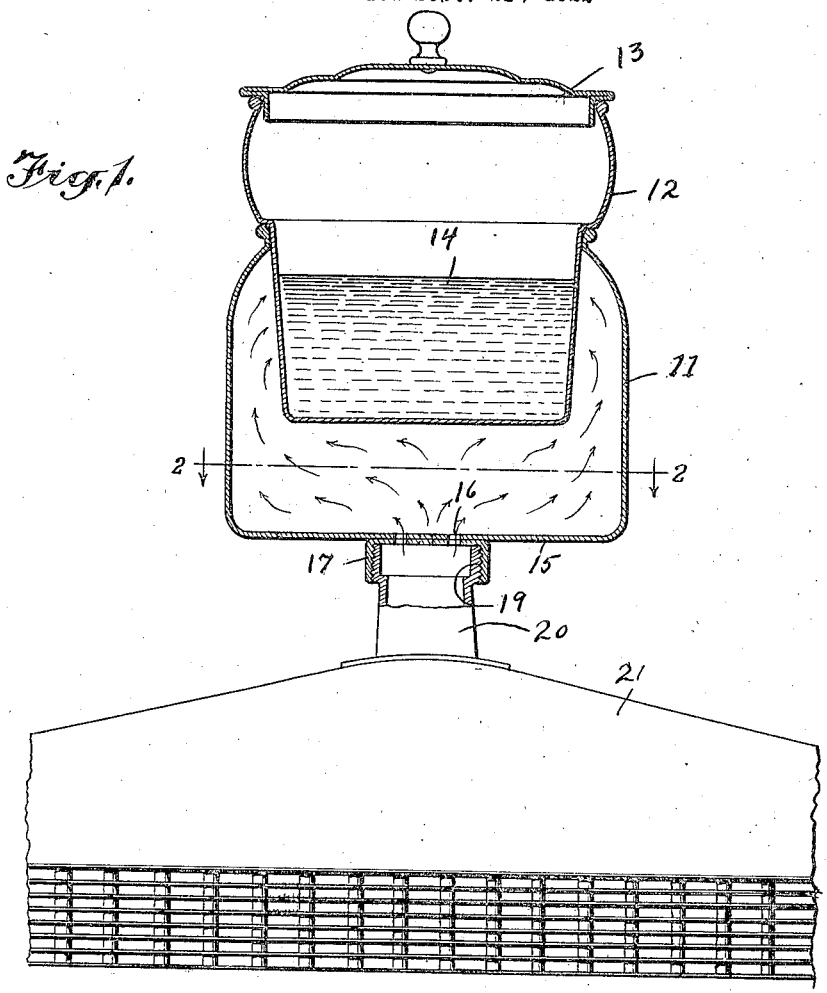
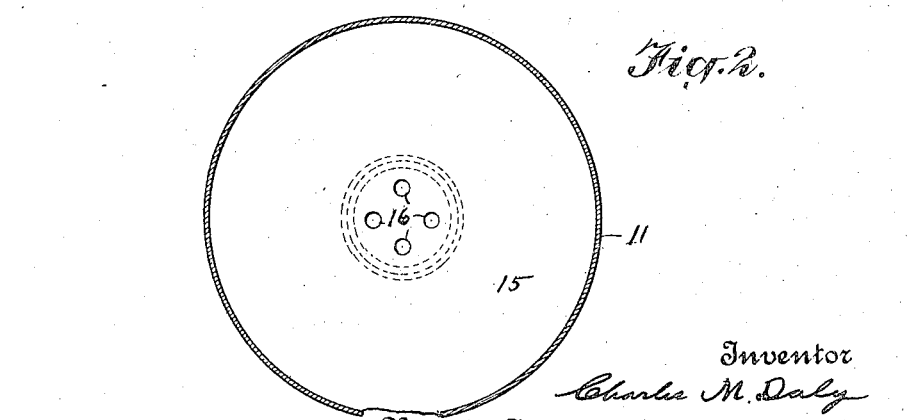
Inventor
Charles M. Daly
By his Attorneys
Dean, Fairbank, Obright & Hirsch Patented July 31, 1923.

1,463,576

UNITED STATES PATENT OFFICE.

CHARLES M. DALY, OF EAST ELMHURST, NEW YORK.

COOKER ATTACHMENT FOR AUTOMOBILE RADIATORS.

Application filed September 21, 1922. Serial No. 589,602.

*To all whom it may concern:*

Be it known that I, CHARLES M. DALY, a citizen of the United States, and resident of East Elmhurst, in the county of Queens and State of New York, have invented certain new and useful Improvements in Cooker Attachments for Automobile Radiators, of which the following is a specification.

This invention is an improved device, whereby the steam developed in an automobile engine may be utilized for cooking purposes.

One object of the invention is to provide a cooking vessel which can be readily and rigidly fastened, at will, to the filling neck of an automobile radiator and heated by the steam passing into the latter from the engine jacket.

A further object is to so construct the parts that the hot vapor or steam may pass into the outer casing of the cooking vessel from the radiator, whereby the steam or vapors are cooled in giving up their heat by contact with the walls of the inner or food chamber of the vessel, thus resulting in a heating or cooking of the contents of the inner chamber, a condensing of the steam or vapors in the outer chamber and a return of the condensate to the water circulating system of the engine. Thus, the water or steam of the circulating system does not enter the food chamber to contaminate the contents of the latter.

The drawings illustrate one embodiment of the invention. In these drawings:

Fig. 1 is a view showing part of an automobile radiator in elevation with a cooking device shown in section, attached thereto; and, Fig. 2 is a horizontal section taken on the line 2—2 of Fig. 1.

It is, of course, understood that the particular arrangement of parts shown and the character of the materials used can be reasonably varied from those shown and described without departing from the spirit of the invention, as set forth.

In general, the invention includes a pair of vessels, the outer one having a perforate bottom and means fastened to the bottom and encircling the perforated part, for rigidly fastening the vessel to the filling neck of an automobile.

The form shown in the drawings includes a cooking vessel of the "double boiler" type, comprising an outer vessel 11 within which an inner vessel 12 is nested, to space the bottoms apart and leave an annular chamber around the lower part of the inner vessel. The inner vessel 12 may have a cover 13 and is of a construction adapted to contain the material to be cooked or heated, indicated as liquid 14.

The bottom 15 of the vessel 11 is provided with one or more perforations 16 at the center portion, serving as steam inlets and condensate outlets. The bottom has means for rigidly but detachably securing the outer vessel to the filling inlet of a radiator and at the same time to form a fluid-tight connection. This is shown as a collar 17 rigidly secured to the bottom 15 and encircling the perforated area. This tubular member 17 is provided with means such as the threads 19 permitting rigid engagement with the filling neck 20 of the radiator 21. The threads 19 can of course be interior or exterior of the collar 17 dependent on the character of the filling neck 20. The tubular member may be made the same in all respects as an ordinary radiator cap except for its perforations and attachment to the vessel 11.

The device is readily attached rigidly to the radiator. The fluid from the radiator passing through the perforations 16 will enter the vessel 11 and heat the surface of the vessel 12 to cook or heat the contents of the latter. The rigid attachment of the device insures its securing on the radiator even when the engine and possibly the automobile, is running.

Under some circumstances the device may be used even though it is not desired to cook or heat anything in the vessel 12. This vessel may be filled with cold water and the cool surfaces of the two vessels will act efficiently to condense the steam from the radiator and serve as an auxiliary condenser to prevent loss of steam from the cooling system when the engine is laboring under heavy load and overheated. For cooking the radiator may be partially covered to insure the formation of steam if the weather be cool, or for other reasons there is no, or an insufficient production of steam.

I do not wish to be limited to the use of steam or vapor in the outer vessel 11. It will of course be evident that the ordinary overflow pipe of the radiator which ordinarily controls the liquid level in the radiator and prevents generation of steam pressure, may be closed by the use of an ordinary cork. The outer vessel 11 may then be attached in place of the ordinary radiator cap, and the outer vessel filled with liquid to any desired depth. This liquid being in open communication with the liquid of the radiator through the apertures 16, will soon take the same temperature as the water of the radiator, and the cooking or heating of the contents of the inner vessel 12 may thus be secured, even though the temperature of the circulating liquid is not raised to the boiling point.

Having thus described my invention, what I claim as new and desire to secure by Letters Patent is:

1. A cooking device adapted to be attached to the filling neck of an automobile radiator, including a vessel having a perforated bottom, and means for rigidly connecting the vessel and the neck with the perforation registering with the latter.

2. A cooking device adapted to be attached to the filling neck of an automobile radiator which includes a vessel having an opening in its bottom, and a tubular member fastened to the bottom of the vessel and encircling the opening, and adapted to be rigidly connected to the filling neck to provide a passage for fluids from the radiator to the vessel.

3. In combination an automobile radiator, a filling neck, a vessel having a perforated bottom, a tubular member surrounding the perforations and fastened to the vessel, and means for rigidly fastening the member to the neck.

4. In combination, an automobile radiator filling neck, a vessel having a perforated bottom, a tubular member encircling the perforations and fastened to the bottom and having threads to engage with those on the neck to rigidly fasten the vessel on the neck.

5. In combination, a cooking vessel having imperforate bottom and side walls, and an outer vessel for supporting the inner vessel and spaced from the bottom and lower side wall portions of the latter, said outer vessel having a perforation in the bottom and means for rigidly securing the outer vessel to an automobile radiator filling neck in place of the usual filling cap, and with said outer vessel in communication with said neck through said perforation, whereby steam may enter the outer vessel through said perforation from the radiator, and the condensate return to the radiator.

Signed at New York, in the county of New York and State of New York, this 20 day of Sept., A. D. 1922.

CHAS. M. DALY.